(12) United States Patent
Ikeda et al.

(10) Patent No.: US 9,859,616 B2
(45) Date of Patent: Jan. 2, 2018

(54) ANTENNA-EQUIPPED FILM AND TOUCH PANEL

(71) Applicant: SMK Corporation, Tokyo (JP)

(72) Inventors: Ryuji Ikeda, Kanagawa (JP);
Masayuki Nagumo, Kanagawa (JP);
Ryo Okamura, Kanagawa (JP);
Kensaku Mizumoto, Kanagawa (JP)

(73) Assignee: SMK Corporation, Tokyo (JP)

( * ) Notice: Subject to any disclaimer, the term of this patent is extended or adjusted under 35 U.S.C. 154(b) by 12 days.

(21) Appl. No.: 15/247,940

(22) Filed: Aug. 26, 2016

(65) Prior Publication Data
US 2017/0279198 A1 Sep. 28, 2017

(30) Foreign Application Priority Data
Mar. 23, 2016 (JP) ................. 2016-058261

(51) Int. Cl.
| H01Q 1/36 | (2006.01) |
| H01Q 7/00 | (2006.01) |
| H04B 5/00 | (2006.01) |
| G06F 3/046 | (2006.01) |
| G06K 19/077 | (2006.01) |

(52) U.S. Cl.
CPC ............... *H01Q 7/00* (2013.01); *G06F 3/046* (2013.01); *G06K 19/07758* (2013.01); *H04B 5/0031* (2013.01)

(58) Field of Classification Search
CPC ................................. H01Q 7/00; H01Q 1/36
USPC ................................. 343/895, 866, 867, 870
See application file for complete search history.

(56) References Cited

U.S. PATENT DOCUMENTS

| 5,337,063 A | 8/1994 | Takahira |
| 6,549,176 B2 * | 4/2003 | Hausladen ....... G06K 19/07749 340/572.1 |
| 7,973,729 B2 * | 7/2011 | Bergman ................. H01Q 1/40 343/742 |
| 2005/0225486 A1 | 10/2005 | Furuki et al. |
| 2011/0193818 A1 | 8/2011 | Chen et al. |

(Continued)

FOREIGN PATENT DOCUMENTS

JP 3160091 U 6/2010

OTHER PUBLICATIONS

Extended European Search Report for European Patent Application No. 16187490.4, issued by the European Patent Office dated Aug. 8, 2017.

*Primary Examiner* — Hoang Nguyen (57) ABSTRACT

The antenna-equipped film includes: a film base; an antenna pattern formed on the film base; and a number-of-winding setting circuit connected to the antenna pattern. The antenna pattern is formed as a plurality of linear loops. The number-of-winding setting circuit includes: first wiring connected to the antenna pattern to constitute a spiral circuit; jumper switches intervening by two each in each lap of the spiral circuit; second wiring connected to the end portion of the innermost lap of the spiral circuit and a position between the two jumper switches in each lap excluding the innermost lap and the outermost lap of the spiral circuit; third wiring connected in common to the other ends of the second wiring; and jumper switches intervening in the second wiring. The outer end of the spiral circuit and the third wiring constitute a pair of terminals.

7 Claims, 10 Drawing Sheets

(56) References Cited

U.S. PATENT DOCUMENTS

2011/0260940 A1 10/2011 Abe et al.
2012/0299863 A1 11/2012 Yilmaz

* cited by examiner

ANTENNA-EQUIPPED FILM AND TOUCH PANEL

CROSS REFERENCE TO RELATED APPLICATION

The contents of the following Japanese patent application are incorporated herein by reference, Japanese Patent Application No. 2016-058261 filed on Mar. 23, 2016.

BACKGROUND

1. Technical Field

The present invention relates to an antenna-equipped film and a touch panel using the same.

2. Description of the Related Art

Touch panels are divided into a resistive film type, a capacitance type, an optical type, and the like. In recent years, the capacitance-type touch panels have been becoming mainstream. The capacitance-type touch panel is formed by combining transparent electrodes patterned vertically and horizontally. When a finger approaches the surface of the touch panel, the electrodes in the approached part change in capacitance and the capacitance change is detected to locate the approached position. The size of the touch panel varies from large sizes (for example, the diagonal dimension is 10 to 15 inches) to small sizes (for example, the diagonal dimension is 5 to 8 inches). The large-sized touch panel has a meshed electrode pattern using copper or silver as a low-resistance element to obtain the sensitivity equivalent to that of the small-sized touch panel.

The general touch panels are known to have a two-layer structure in which a sensor electrode pattern is formed on the front surface of a film base and a drive wiring pattern is formed on the back surface of the same. In addition, there are proposed various kinds of one-layer structures in which a sensor electrode pattern and a drive wiring pattern are formed on one surface of a film base for simplified manufacturing process and price reduction.

Further, touch panels containing an antenna separately from a touch sensor have been used in recent years (for example, refer to Japanese Utility Model No. 3160091). This kind of touch panel performs near field communication using the contained antenna with a communication partner such as an IC chip-incorporated card or a cellular phone. By containing an antenna pattern in a touch panel, it is possible to save space for a near field communication antenna or a Bluetooth® antenna that have been externally attached, thereby to provide a smaller-sized device.

Japanese Utility Model No. 3160091 discloses a touch panel with a near field communication antenna in which an antenna pattern constituting the antenna is formed on the touch panel. The antenna pattern inclines to form an angle of 15° or more relative to vertical pixel rows displayed on a display panel combined with the touch panel. According to this configuration, interference is unlikely to occur between the antenna pattern and the vertical pixel rows, thereby suppressing the appearance of moire.

In general, the start point and the terminal end of the antenna pattern are drawn out to the film end portions. To form a plurality of loop antenna patterns on one surface of the film base, the antenna patterns cross one another. Accordingly, it is necessary to form the antenna patterns on the both surfaces of the film base via through holes. This leads to increase in production price as compared to the formation on one surface.

When a touch panel electrode pattern is formed on the other surface of the film base, it is hard to form the antenna by antenna patterns on the both surfaces.

As an example of formation of an antenna pattern on one surface, Japanese Utility Model No. 3160091 discloses the touch panel equipped with a near field communication antenna. However, when the resonance point between the antenna pattern and the antenna of the communication partner does not match the desired value, it is necessary to re-form the antenna pattern for matching of the resonance point.

SUMMARY

The present invention is devised to solve the foregoing problems. An object of the present invention is to provide an antenna-equipped film with which, when the resonance point does not match the desired value, the resonance point can be matched by changing the number of windings without having to re-form the antenna pattern, and near field communications can be reliably performed with the communication partner, and a touch panel using the antenna-equipped film.

To attain the foregoing object, an antenna-equipped film according to an aspect of the present invention includes: a film base; an antenna pattern formed on one surface of the film base; and a number-of-winding setting circuit that is provided outside the film base and connected to the antenna pattern, wherein the antenna pattern has both end portions positioned at the end edge of the film base and is formed as a plurality of linear loops surrounding a vacant area in the center, the number-of-winding setting circuit is connected to corresponding end portions of the antenna pattern to constitute one spiral circuit, and the number-of-winding setting circuit includes: first wiring as a plurality of first linear patterns; a plurality of first on-off elements that intervenes by two each in a position corresponding to each lap in the first wiring of the spiral circuit; second wiring as a plurality of second linear patterns that is connected to the end portion of the innermost lap in the first wiring of the spiral circuit and a position between the two first on-off elements in each lap excluding the innermost lap and the outermost lap in the first wiring of the spiral circuit; third wiring as a third linear pattern that is connected in common to the other ends of the plurality of second linear patterns; and a plurality of second on-off elements that intervenes in the plurality of second linear patterns, and the outer end of the spiral circuit and the third wiring constitute a pair of terminals.

This configuration makes it easy to change the number of windings in the antenna. Accordingly, it is possible to perform reliably near field communications with the communication partner while matching the resonance point with the communication partner to the desired value.

The number-of-winding setting circuit may be configured to use jumper switches as the first on-off elements and the second on-off elements.

This configuration makes it possible to simplify the structure of the number-of-winding setting circuit to reduce the manufacturing costs.

The number-of-winding setting circuit may be configured to use semiconductor switches as the first on-off elements and the second on-off elements.

This configuration makes it possible to change automatically the number of windings in the antenna by means of programming or the like, thereby facilitating the task of changing the number of windings.

The film base may include a plurality of antenna patterns.

This configuration makes it possible to use in common the antenna for communications with the communication partner such as an IC card and a selection button on the touch panel. A desired one can be selected from among the plurality of antenna patterns to increase the degree of freedom for layout.

The antenna pattern may have a linear width of about several to 20 μm or have wiring patterned in a meshed form to make the antenna pattern less visible.

A touch panel according to an aspect of the present invention is configured such that an electrode pattern for detection of touch positions in an X direction and a Y direction is provided on the other surface of the film base of the antenna-equipped film described above, and a cover panel is laid on the other surface.

This configuration makes it possible to form the film base as a single sheet of a simple structure, thereby to simplify the manufacturing process and reduce the manufacturing costs.

A touch panel according to an aspect of the present invention is configured such that the antenna-equipped film described above further has another film base, a pair of electrode patterns for detection of touch positions in the X direction and the Y direction is separately provided on the both surfaces of the other film base, the other film base is laid on the surface of the film base opposite to the surface on which the antenna pattern is formed, and the cover panel is laid on the other film base.

This configuration makes it possible to provide the pair of electrode patterns separately on the both surfaces, thereby simplifying the electrode patterns as compared to the case where an electrode pattern is provided on one surface.

According to an aspect of the present invention, it is possible to provide an antenna-equipped film that performs reliably near field communications with the communication partner while matching the resonance point with the communication partner to the desired value, and a touch panel using the antenna-equipped film.

DETAILED DESCRIPTION

Antenna-equipped films and touch panels using the same according to embodiments of the present invention will be explained below with reference to the drawings.

First Embodiment

Figure 1A:
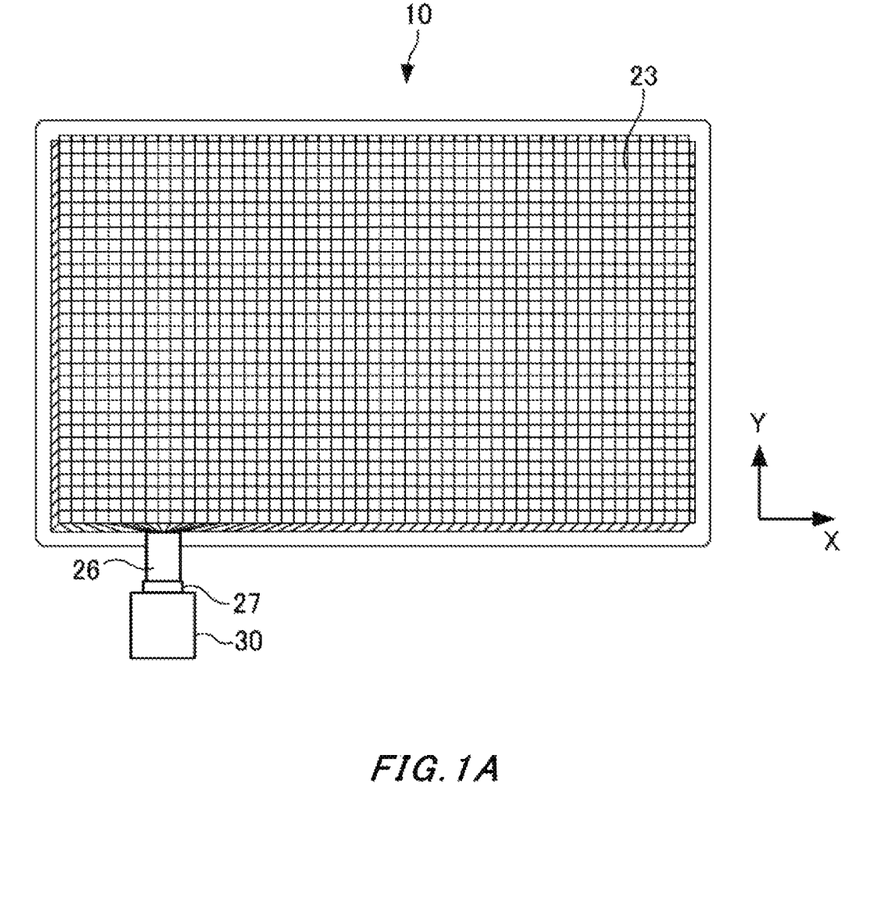
FIG. 1A illustrates a schematic front view of a touch panel using an antenna-equipped film according to a first embodiment of the present invention.
Figure 1B:
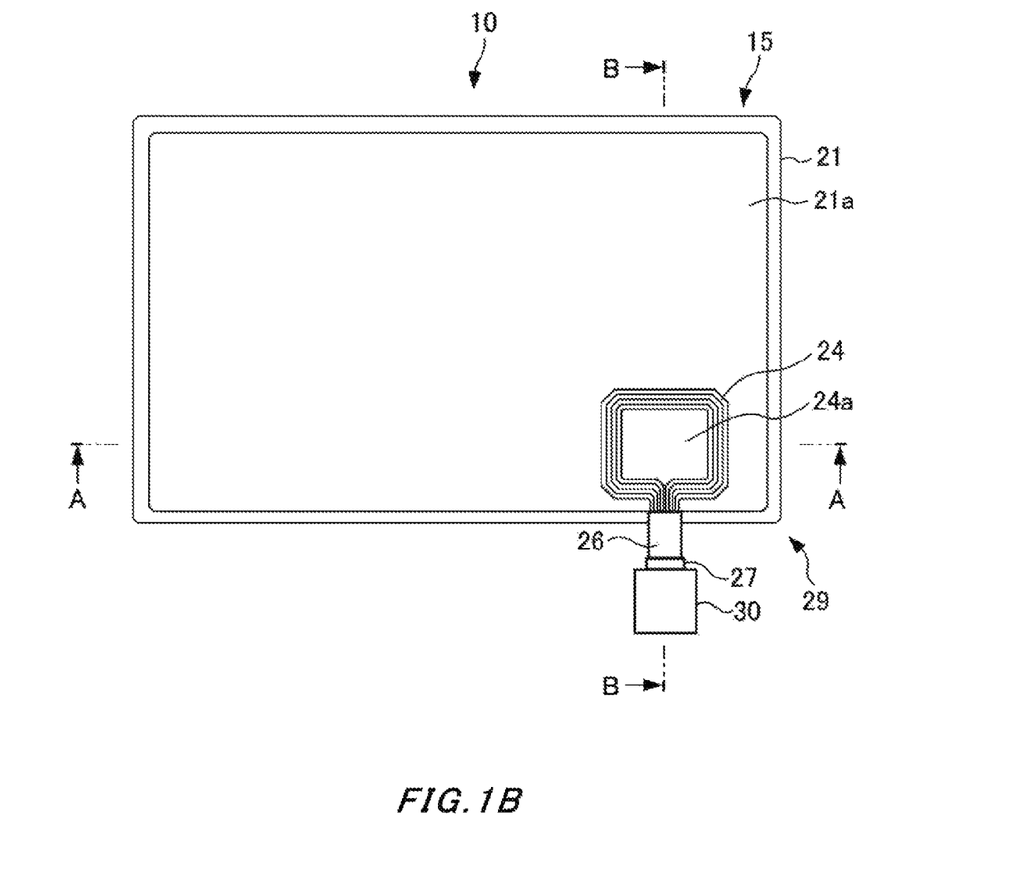
FIG. 1B illustrates a schematic rear view of a touch panel using an antenna-equipped film according to a first embodiment of the present invention.

FIG. 1A is a schematic front view of a touch panel 10 using an antenna-equipped film 15 according to a first embodiment, and FIG. 1B is a schematic rear view of the same. As illustrated in FIG. 1B, the antenna-equipped film 15 according to the first embodiment includes a film base 21, an antenna pattern 24 formed on one surface of the film base 21, and a number-of-winding setting circuit 30 that is provided outside the film base 21 and is connected to the antenna pattern 24. The antenna pattern 24 is arranged within a touch operation effective range 21a of the film base 21. As illustrated in FIG. 1A, an electrode pattern 23 is provided on the other surface of the film base 21 to detect the position of a finger-touch operation by electrostatic capacitance method.

The antenna-equipped film 15 performs near field communications with the communication partner by RFID or the like using a loop antenna 29 composed of the antenna pattern 24 and the number-of-winding setting circuit 30 to send and receive information in a non-contact manner. The communication partner is a boarding card for transportation, an electronic payment IC card, a cellular phone equipped with a data communication IC chip, or the like, for example.

Figure 2A:
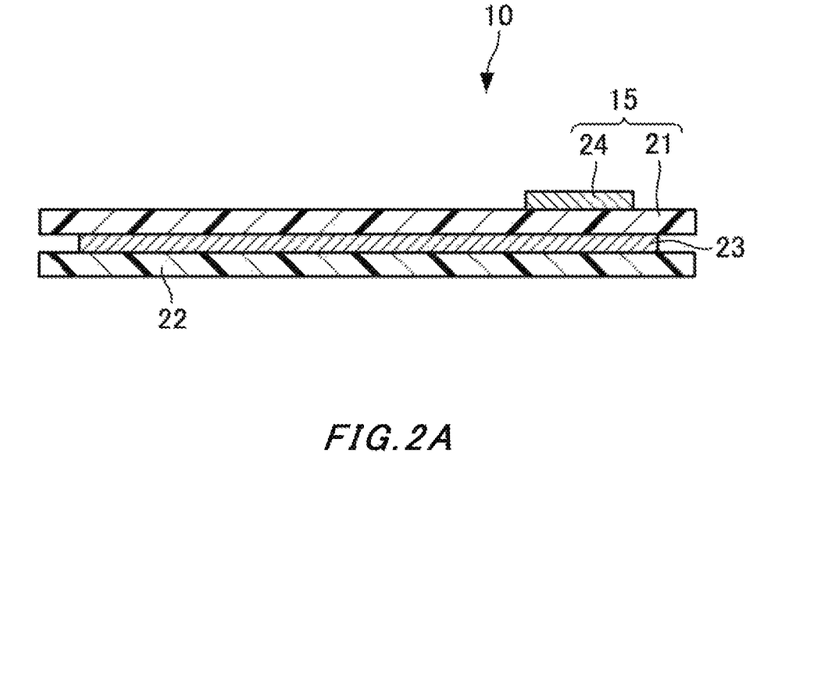
FIG. 2A is a cross-sectional view of FIG. 1B taken along line A-A.

FIG. 2A is a cross-sectional view of FIG. 1B taken along a line A-A. As illustrated in FIG. 2A, the touch panel 10 has the antenna pattern 24 on one surface (upper surface) of the film base 21 and has the electrode pattern 23 for detecting touch positions in an X direction and a Y direction on the other surface (lower surface), and has a cover panel 22 laid on the electrode pattern 23. Besides the electrode pattern 23, a direction detection pattern or a Bluetooth antenna pattern for detecting the direction of input in the air may be provided on the upper surface of the film base 21.

Figure 2B:
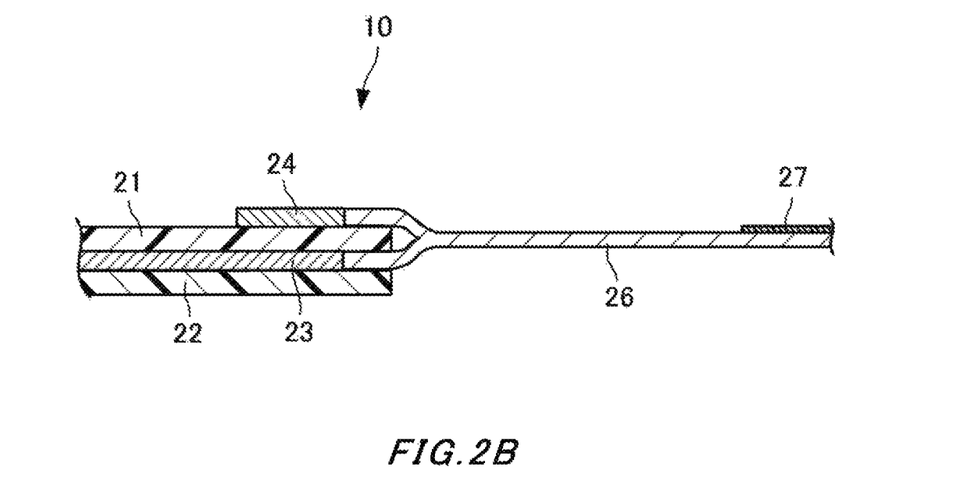
FIG. 2B is a cross-sectional view of FIG. 1B taken along line B-B.

As illustrated in FIG. 1B, the number-of-winding setting circuit 30 is connected to the end portion of the antenna pattern 24 constituting the loop antenna 29 via a flexible printed wiring board (FPC) 26 and an FPC connector 27. FIG. 2B is a cross-sectional view of FIG. 1B taken along a line B-B. As illustrated in FIG. 2B, the electrode pattern 23 is also connected to a control unit 50 (see FIG. 3) via the same flexible printed wiring board 26. The electrode pattern 23 may be connected to the control unit 50 via a flexible printed wiring board other than the flexible printed wiring board 26.

The film base 21 is a rectangular thin film base made of polyethylene terephthalate (PET), for example. The cover panel 22 is a thin plate member made of glass, polycarbonate (PC), or acrylic resin (PMMA).

The electrode pattern 23 is formed of copper or silver with low electric resistance on the film base 21 by using singly or in combination techniques such as etching, evaporation, screen printing, and photolithography. The line width of the pattern is about several to 20 μm to make the pattern less visible so as not to interfere with display on the display unit such as a liquid crystal screen. The interval between the lines in the pattern is about ten times larger than the line width.

In the embodiment, the electrode pattern 23 is wired in a meshed manner so as not to interfere with display on the display unit such as a liquid crystal display.

The electrode pattern 23 has an electrode pattern for detecting the position of a touch operation on the touch panel 10 in the X-axis direction, an electrode pattern for detecting the position of a touch operation in the Y-axis direction, and a wiring pattern for retrieving signals from the foregoing patterns.

The position of a touch operation is detected by the electrode pattern 23 taking the advantage of the fact that the electrodes in the part approached by a finger on the touch panel 10 change in capacitance. The change in the capacitance is detected in the X-axis direction and the Y-axis direction to locate the XY coordinates of the finger, that is, the position on the touch panel 10.

Figure 3:
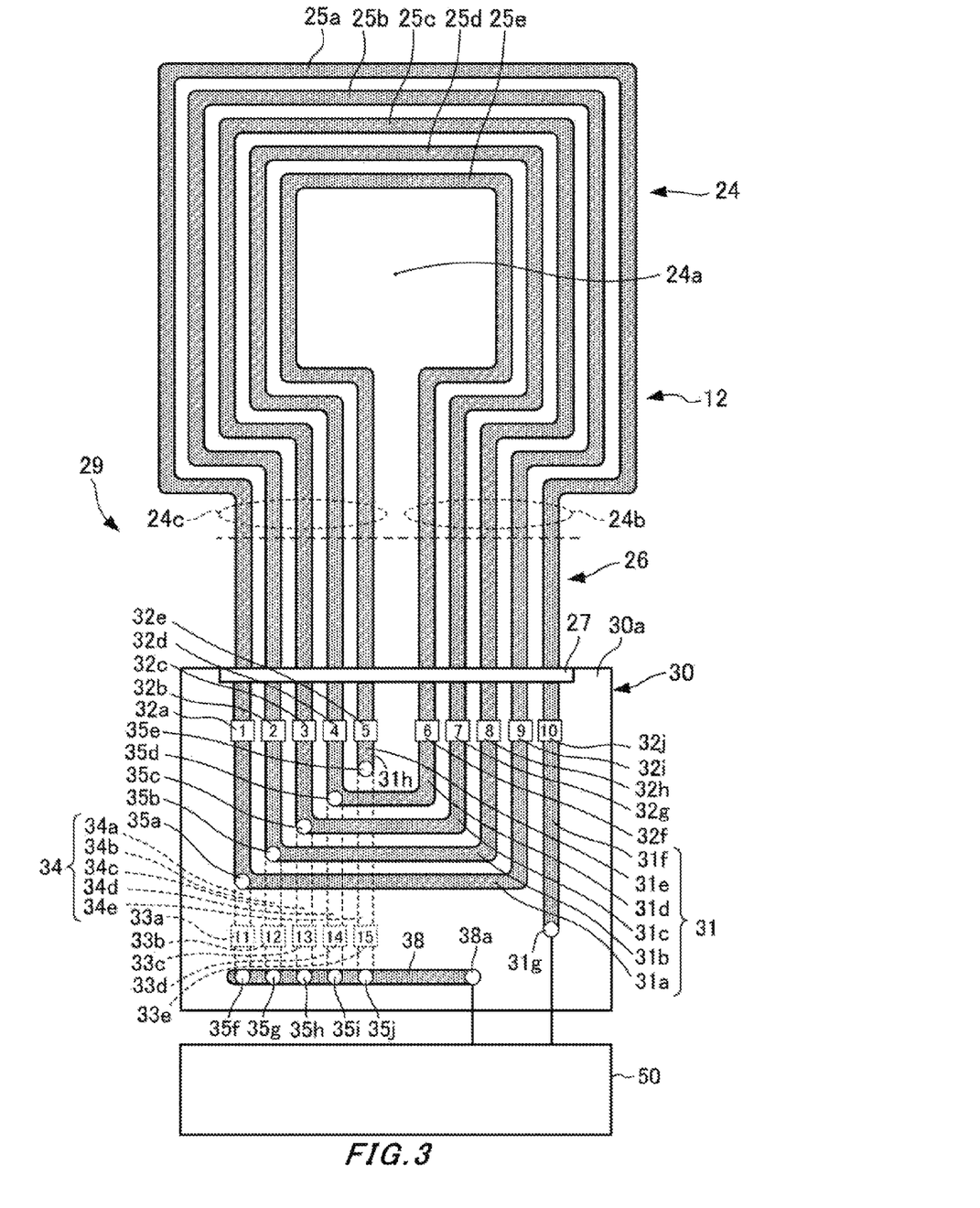
FIG. 3 is a schematic view of an antenna pattern and a number-of-winding setting circuit according to the first embodiment of the present invention.

As illustrated in FIG. 3, the antenna pattern 24 has both end portions 24b and 24c positioned at the end edge of the film base 21 and is formed as a plurality of linear loops 25a to 25e surrounding a vacant area 24a in the center. Specifically, the antenna pattern 24 has the linear loops 25a, 25b, 25c, 25d, and 25e composed of a number of linear conductors equal to the largest number of windings and arranged around the rectangular vacant area 24a at predetermined intervals. In the embodiment, the largest number of windings in the loop antenna 29 is five, and therefore the antenna pattern 24 has the five linear loops 25a to 25e.

The antenna pattern 24 is formed of copper or silver with low electric resistance on the film base 21 by using singly or in combination techniques such as etching, evaporation, screen printing, and photolithography. From the viewpoint of facilitating the manufacture, the antenna pattern 24 is preferably formed in the same manner as the electrode pattern 23. The line width of the pattern is about several to 20 μm to make the pattern less visible so as not to interfere with display on the display unit such as a liquid crystal screen. The interval between the lines in the pattern is about ten times larger than the line width. The antenna pattern 24 may be formed on another film base and be attached to the film base 21, instead of forming the antenna pattern 24 directly on the film base 21.

Figure 9:
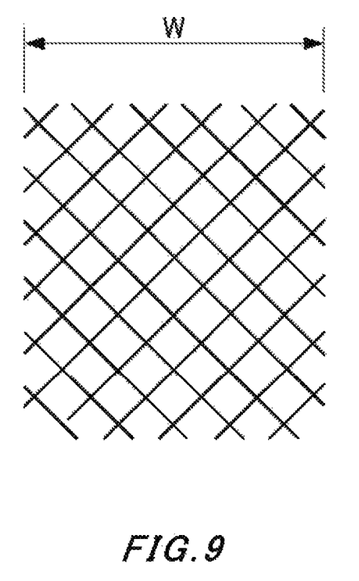
FIG. 9 is a partial enlarged plane view of a configuration of an antenna pattern with meshed wiring.

In the embodiment, the antenna pattern 24 is formed in solid wiring. Alternatively, the antenna pattern 24 may be formed with a pattern of line width W in a meshed manner as illustrated in FIG. 9 to prevent interference with display on the display unit such as a liquid crystal screen.

Figure 6A:
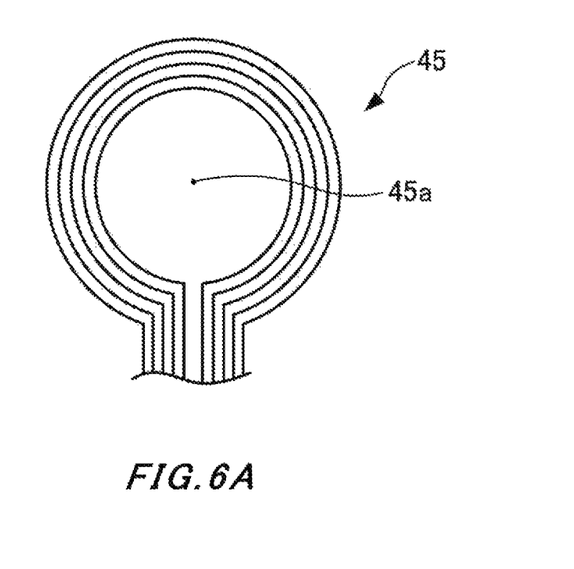
FIG. 6A is a diagram an illustrating modification example of antenna pattern according to the embodiment of the present invention.
Figure 6B:
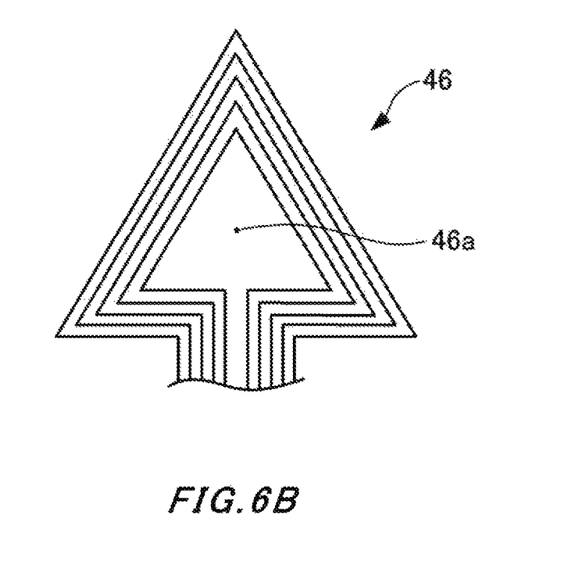
FIG. 6B is a diagram an illustrating modification example of antenna pattern according to the embodiment of the present invention.
Figure 6C:
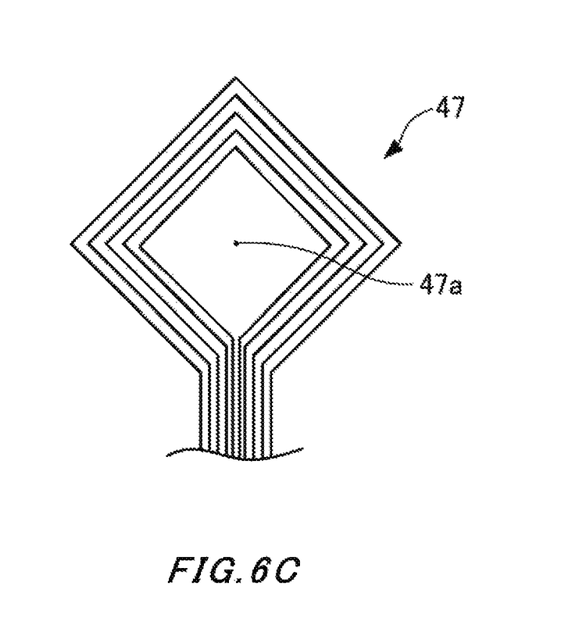
FIG. 6C is a diagram an illustrating modification example of antenna pattern according to the embodiment of the present invention.

In the embodiment, the vacant area 24a of the antenna pattern 24 is rectangular but the shape of the vacant area 24a is not limited to this. As illustrated in FIGS. 6A-6C, an antenna pattern of any shape can be employed depending on the antenna shape of the communication partner, such as an antenna pattern 45 with a circular vacant area 45a, an antenna pattern 46 with a triangular vacant area 46a, an antenna pattern 47 with a rhomboid vacant area 47a.

The number-of-winding setting circuit 30 is connected to the antenna pattern 24 to set the number of windings such that the antenna pattern 24 serves as the loop antenna 29 with the desired number of windings. Specifically, as illustrated in FIG. 3, the number-of-winding setting circuit 30 has first wiring 31, second wiring 34, third wiring 38, jumper switches 32a to 32j as a plurality of first on-off elements, and jumper switches 33a to 33e as a plurality of second on-off elements.

The first wiring 31 is composed of a plurality of first linear patterns 31a to 31f connected to corresponding end portions of the antenna pattern 24 to constitute one spiral circuit 12. In the embodiment, the antenna pattern 24 and the first wiring 31 constitute a five-winding spiral circuit 12.

The jumper switches 32a to 32j as the first on-off elements are provided to intervene by two each for each lap in the first winding 31 of the spiral circuit 12 at corresponding positions. Specifically, the jumper switches 32j and 32a are provided in the first linear patterns 31f and 31a, respectively, that fall under the first lap from the outside. The jumper switches 32i and 32b are provided in the first linear patterns 31a and 31b, respectively, that fall under the second circle from the outside. The jumper switches 32h and 32c are provided in the first linear patterns 31b and 31c, respectively, that fall under the third circle from the outside. The jumper switches 32g and 32d are provided in the first linear patterns 31c and 31d, respectively, that fall under the fourth circle from the outside. The jumper switches 32f and 32e are provided in the first linear patterns 31d and 31e, respectively, that fall under the fifth circle from the outside.

The second wiring 34 is composed of a plurality of second linear patterns 34a to 34e connected to an inner end portion 31h of the innermost lap in the spiral circuit 12 in the first wiring 31 and between the two jumper switches in each of the laps excluding the innermost and outermost laps. Specifically, the second linear pattern 34a is connected at a position between the jumper switches 32a and 32i in the first linear pattern 31a that falls under the first lap from the outside excluding the innermost and outermost laps. The second linear pattern 34b is connected at a position between the jumper switches 32b and 32h in the first linear pattern 31b that falls under the second lap from the outside excluding the innermost and outermost laps. The second linear pattern 34c is connected at a position between the jumper switches 32c and 32g in the first linear pattern 31c that falls under the third lap from the outside excluding the innermost and outermost laps. The second linear pattern 34d is connected at a position between the jumper switches 32d and 32f in the first linear pattern 31d that falls under the fourth lap from the outside excluding the innermost and outermost laps. The second linear pattern 34e is connected to the end portion 31h of the first linear pattern 31e that falls under the innermost lap.

Specifically, the second linear pattern 34a is formed on the back surface of a substrate 30a and is connected to the first linear pattern 31a formed on the front surface of the substrate 30a by a conductive through hole 35a of which the inner surface is coated with a conductive material. The second linear pattern 34a is connected to the third wiring 38 on the front surface by a conductive through hole 35f of which the inner surface is coated with a conductive material.

Similarly, the second linear pattern 34b is formed on the back surface of the substrate 30a and is connected to the first linear pattern 31b formed on the front surface of the substrate 30a by a conductive through hole 35b. The second linear pattern 34b is connected to the third wiring 38 on the front surface by a conductive through hole 35g.

Similarly, the second linear pattern 34c is formed on the back surface of the substrate 30a and is connected to the first linear pattern 31c formed on the front surface of the substrate 30a by a conductive through hole 35c. The second linear pattern 34c is connected to the third wiring 38 on the front surface by a conductive through hole 35h.

Similarly, the second linear pattern 34d is formed on the back surface of the substrate 30a and is connected to the first linear pattern 31d formed on the front surface of the substrate 30a by a conductive through hole 35d. The second linear pattern 34d is connected to the third wiring 38 on the front surface by a conductive through hole 35i.

Similarly, the second linear pattern 34e is formed on the back surface of the substrate 30a and is connected to the first linear pattern 31e formed on the front surface of the substrate 30a by a conductive through hole 35e. The second linear pattern 34e is connected to the third wiring 38 on the front surface by a conductive through hole 35j.

The third wiring 38 is one third linear pattern that is connected in common to the other ends of the plurality of second linear patterns 34a to 34e.

The jumper switches 33a to 33e as the second on-off elements intervene in the plurality of second linear patterns 34a to 34e, respectively, on the back surface of the substrate 30a.

The substrate 30a may have a three-layer structure in which a GND (ground) layer is provided between a front surface layer and a back surface layer.

In the number-of-winding setting circuit 30, an outer end 31g of the spiral circuit 12 and the third wiring 38 constitute a pair of terminals (31g and 38a). These terminals (31g and 38a) in a pair constitute the both end portions of the loop antenna 29 and are connected to the control unit 50.

The number-of-winding setting circuit 30 is configured to set the number of windings by switching the on and off states of the jumper switches 32a to 32j as the first on-off elements and the jumper switches 33a to 33e as the second on-off elements.

Next, a method for changing (setting) the number of windings in the loop antenna 29 will be explained.

To use the one-winding loop antenna 29, the jumper switches 32a, 32j, and 33a are brought into a closed state by attachment of jumper plugs (resistors), and the other jumper switches are brought into an open state without attachment of jumper plugs. Accordingly, the one-winding loop antenna 29 with the linear loop 25a is formed with the both end portions connected to the control unit 50 by the start end 31g and the terminal end 38a.

To use the two-winding loop antenna 29, the jumper switches 32a, 32b, 32i, 32j, and 33b are brought into a closed state by attachment of jumper plugs (resistors), and the other jumper switches are brought into an open state without attachment of jumper plugs. Accordingly, the two-winding loop antenna 29 with the linear loops 25a and 25b is formed with the both end portions connected to the control unit 50 by the start end 31g and the terminal end 38a.

To use the three-winding loop antenna 29, the jumper switches 32a, 32b, 32c, 32h, 32i, 32j, and 33c are brought into a closed state by attachment of jumper plugs (resistors), and the other jumper switches are brought into an open state without attachment of jumper plugs. Accordingly, the three-winding loop antenna 29 with the linear loops 25a to 25c is formed with the both end portions connected to the control unit 50 by the start end 31g and the terminal end 38a.

To use the fourth-winding loop antenna 29, the jumper switches 32a, 32b, 32c, 32d, 32g, 32h, 32i, 32j, and 33d are brought into a closed state by attachment of jumper plugs (resistors), and the other jumper switches are brought into an open state without attachment of jumper plugs. Accordingly, the fourth-winding loop antenna 29 with the linear loops 25a to 25d is formed with the both end portions connected to the control unit 50 by the start end 31g and the terminal end 38a.

To use the fifth-winding loop antenna 29, the jumper switches 32a, 32b, 32c, 32d, 32e, 32f, 32g, 32h, 32i, 32j, and 33e are brought into a closed state by attachment of jumper plugs (resistors), and the other jumper switches are brought into an open state without attachment of jumper plugs. Accordingly, the fifth-winding loop antenna 29 with the linear loops 25a to 25e is formed with the both end portions connected to the control unit 50 by the start end 31g and the terminal end 38a.

In the embodiment, the jumper switches 32a to 32j and 33a to 33e are used. However, the switches are not limited to them but may be any other switches such as DIP switches instead of the jumper switches. In the embodiment, the five linear loops 25a to 25e are used. However, the number of the loops is not limited to this but an arbitrary number of linear loops may be provided according to the maximum number of windings.

Next, the operations and effects will be explained.

In the antenna-equipped film 15 and the touch panel 10 using the same according to the embodiment, the number of windings in the loop antenna 29 can be easily changed. Accordingly, by changing the number of windings to provide the optimum range of communications with the communication partner, it is possible to perform reliably near field communications with the communication partner while matching the resonance point with the communication partner to the desired value. For example, when the communication signal is small, the number of windings in the loop antenna 29 can be increased to make the communication signal larger. When the communication signal is too large, the number of windings in the loop antenna 29 can be decreased to make the communication signal smaller.

In the antenna-equipped film 15 and the touch panel 10 using the same according to the embodiment, the jumper switches 32a to 32j and 33a to 33e are used in the number-of-winding setting circuit 30. This makes it possible to change easily the number of windings and simplify the configuration of the number-of-winding setting circuit 30, thereby suppressing the manufacturing costs.

The antenna-equipped film 15 and the touch panel 10 using the same according to the embodiment are provided in a simple structure in which the antenna pattern 24 is provided on one surface of the one film base 21 and electrode pattern 23 is provided on the other surface of the same. This makes it possible to simplify the manufacturing process. This leads to reduction in the manufacturing costs.

Second Embodiment

Next, an antenna-equipped film 15 and a touch panel 10 using the same according to a second embodiment of the present invention will be explained.

Figure 4:
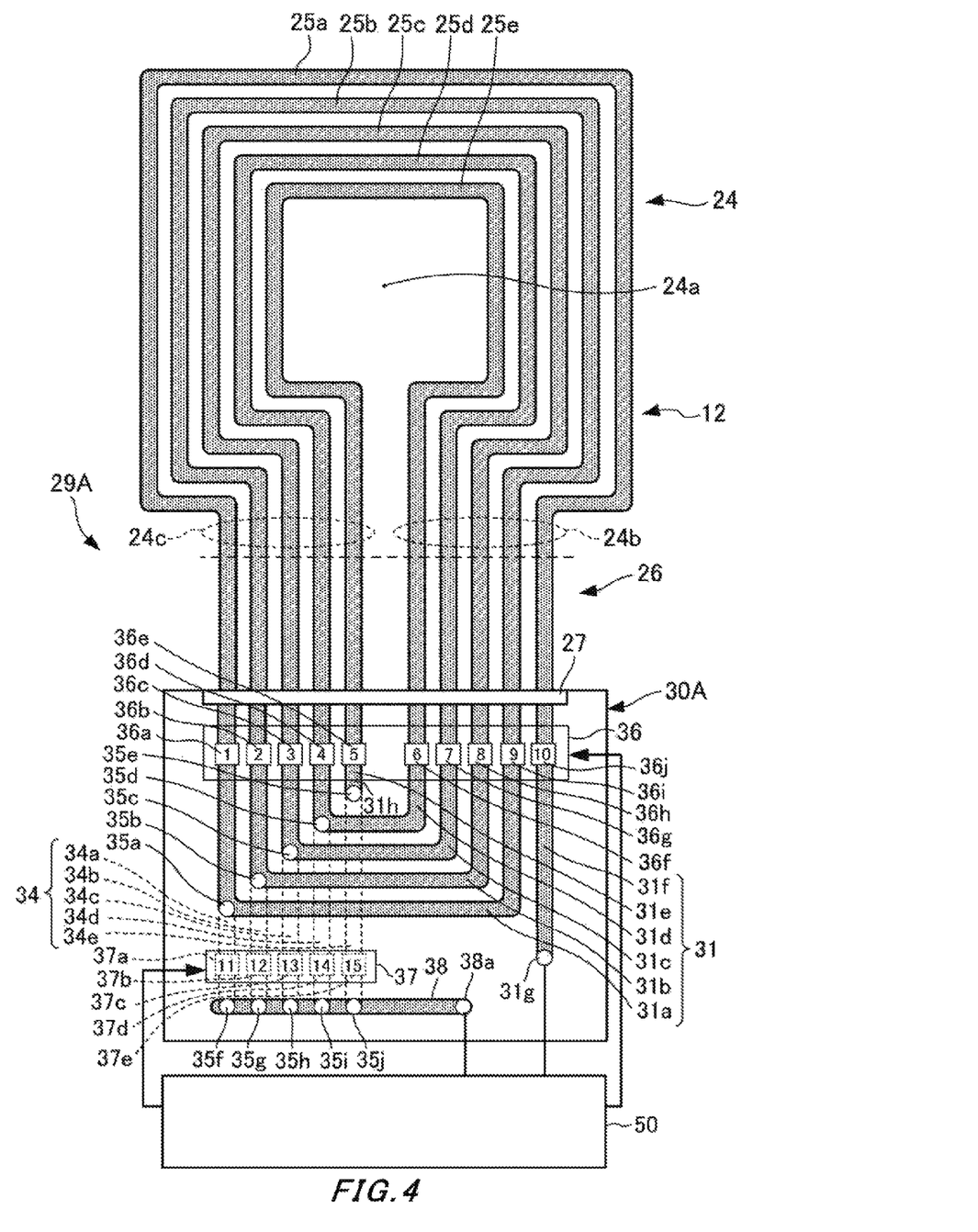
FIG. 4 is a schematic view of an antenna pattern and a number-of-winding setting circuit according to a second embodiment of the present invention.

The antenna-equipped film 15 according to the second embodiment is configured in the same manner as the antenna-equipped film 15 according to the first embodiment except that semiconductor switches 36 and 37 are used in a number-of-winding setting circuit 30A. Accordingly, descriptions of the same components are omitted below As illustrated in FIG. 4, the number-of-winding setting circuit 30A according to the second embodiment is configured to set the number of windings by switching between the on-off states of the semiconductor switches 36a to 36j as first on-off elements and the semiconductor switches 37a to 37e as second on-off elements.

Figure 5:
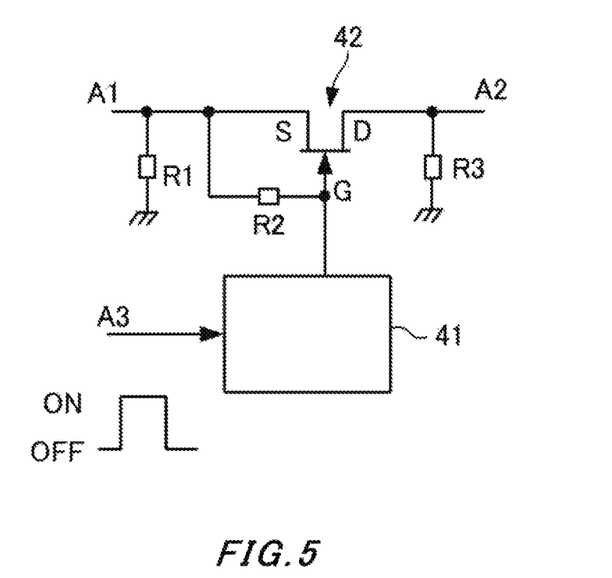
FIG. 5 is a circuit diagram of a semiconductor switch in the number-of-winding setting circuit according to the second embodiment of the present invention.

The semiconductor switches 36a to 36j are controlled to be turned on and off (opened and closed) by the control unit 50. The semiconductor switches 37a to 37e are also controlled to be turned on and off by the control unit 50. The semiconductor switches 36a to 36j and 37a to 37e are configured as illustrated in FIG. 5. The control unit 50 sends a control signal for instructing for on and off states to a terminal A3 of the semiconductor switches 36a to 36j and 37a to 37e. The control signal is converted into a proper voltage level by a voltage level shifter 41 and is given to a gate G of an FET 42. The continuity between a source S and a drain D is regulated to control the opening and closing of the terminal A1 and the terminal A2.

Next, a method for changing the number of windings in a loop antenna 29A will be described.

To use the one-winding loop antenna 29A, the semiconductor switches 36a, 36j, and 37a are turned on (closed state) and the other semiconductor switches are turned off (open state) by the control signal from the control unit 50. Accordingly, the one-winding loop antenna using the linear loop 25a is formed with the both end portions connected to the control unit 50 by the start end 31g and the terminal end 38a.

To use the two-winding loop antenna 29A, the semiconductor switches 36a, 36b, 36i, 36j, and 37b are turned on and the other semiconductor switches are turned off by the control signal from the control unit 50. Accordingly, the two-winding loop antenna using the linear loops 25a and 25b is formed with the both end portions connected to the control unit 50 by the start end 31g and the terminal end 38a.

To use the three-winding loop antenna 29A, the semiconductor switches 36a, 36b, 36c, 36h, 36i, 36j, and 37c are turned on and the other semiconductor switches are turned off by the control signal from the control unit 50. Accordingly, the three-winding loop antenna using the linear loops 25a to 25c is formed with the both end portions connected to the control unit 50 by the start end 31g and the terminal end 38a.

To use the four-winding loop antenna 29A, the semiconductor switches 36a, 36b, 36c, 36d, 36g, 36h, 36h, 36i, 36j, and 37d are turned on and the other semiconductor switches are turned off by the control signal from the control unit 50. Accordingly, the four-winding loop antenna using the linear loops 25a to 25d is formed with the both end portions connected to the control unit 50 by the start end 31g and the terminal end 38a.

To use the fifth-winding loop antenna 29A, the semiconductor switches 36a, 36b, 36c, 36d, 36e, 36f, 36g, 36h, 36i, 36j, and 37e are turned on and the other semiconductor switches are turned off by the control signal from the control unit 50. Accordingly, the fifth-winding loop antenna using the linear loops 25a to 25e is formed with the both end portions connected to the control unit 50 by the start end 31g and the terminal end 38a.

As described above, in the antenna-equipped film 15 and the touch panel 10 using the same according to the second embodiment, the semiconductor switches 36 and 37 are used in the number-of-winding setting circuit 30A to make it possible to change automatically the number of windings in the loop antenna 29A by means of programming or the like. This facilitates the task of changing the number of windings. The number of windings in the loop antenna 29A may be changed dynamically during use.

Third Embodiment

Next, an antenna-equipped film 60 and a touch panel using the same according to a third embodiment of the present invention will be explained.

The antenna-equipped film 60 according to the third embodiment is configured in the same manner as the antenna-equipped film 15 according to the first embodiment except that a plurality of antenna patterns 24 is provided. Accordingly, descriptions of the same components are omitted below.

Figure 7:
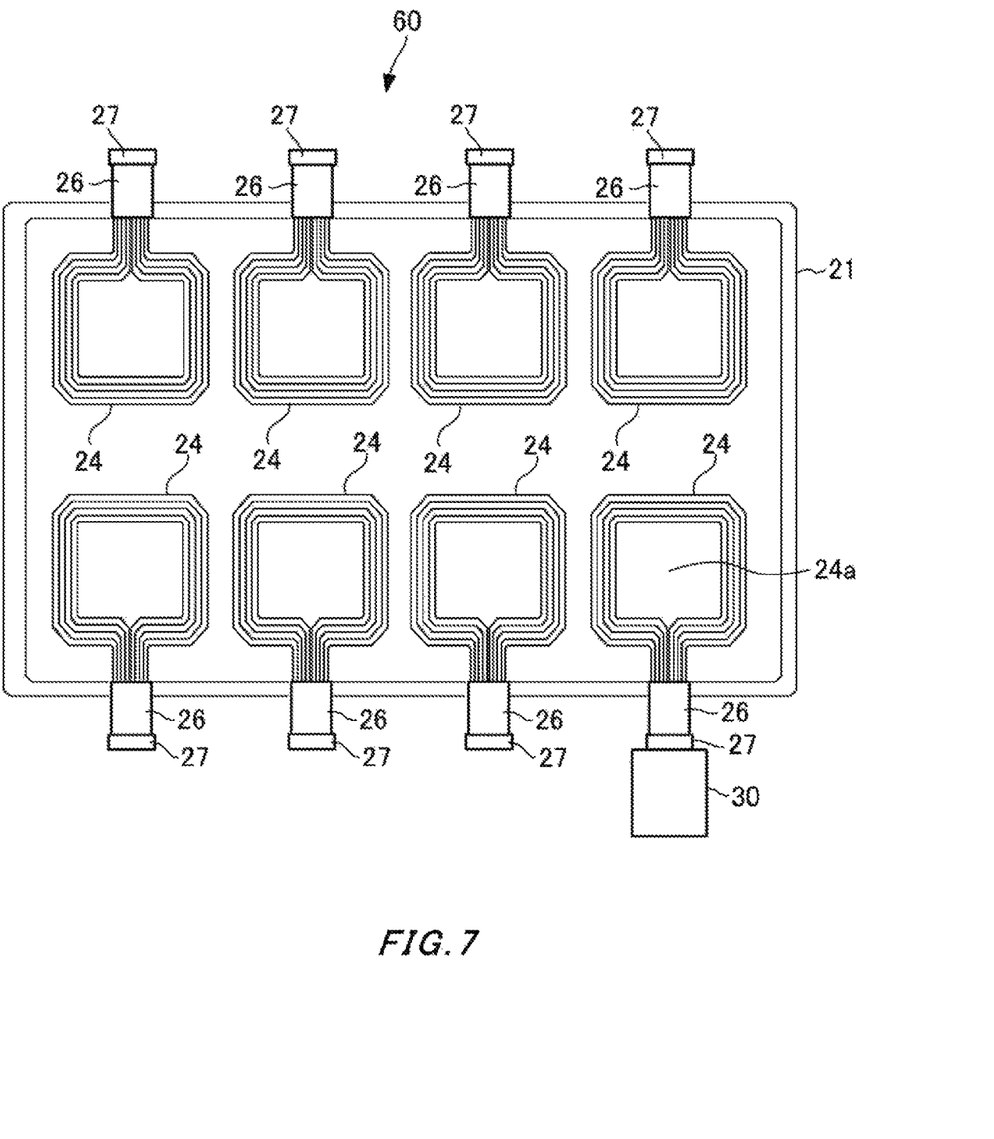
FIG. 7 is a schematic rear view of an antenna-equipped film according to a third embodiment of the present invention.

As illustrated in FIG. 7, the film base 21 of the antenna-equipped film 60 according to the third embodiment includes the plurality of antenna patterns 24. FIG. 7 illustrates the configuration in which the flexible printed wiring board 26, the FPC connector 27, and the number-of-winding setting circuit 30 are connected to one each antenna pattern 24, and the flexible print wiring plates 26, the FPC connectors 27, and the number-of-winding setting circuits 30 are changed as necessary. Alternatively, the number-of-winding setting circuits 30 may be connected to all the antenna patterns 24. The antenna patterns 24 are all rectangular in shape but may have any other shape such as circle, triangle, or rhombus. Some or all of the antenna patterns 24 may be different in shape.

As described above, the antenna-equipped film 60 and the touch panel using the same according to the third embodiment are provided with the plurality of antenna patterns 24. This makes it possible to use in common the antenna for communications with the communication partner such as an IC card and a selection button on the touch panel. A desired one can be selected from among the plurality of antenna patterns 24 to increase the degree of freedom for layout.

Fourth Embodiment

Next, an antenna-equipped film 85 and a touch panel 80 using the same according to a fourth embodiment of the present invention will be explained.

The touch panel 80 according to the fourth embodiment is different from the touch panel 10 according to the first embodiment in the layer structure having a plurality of film bases 72 and 73.

Figure 8:
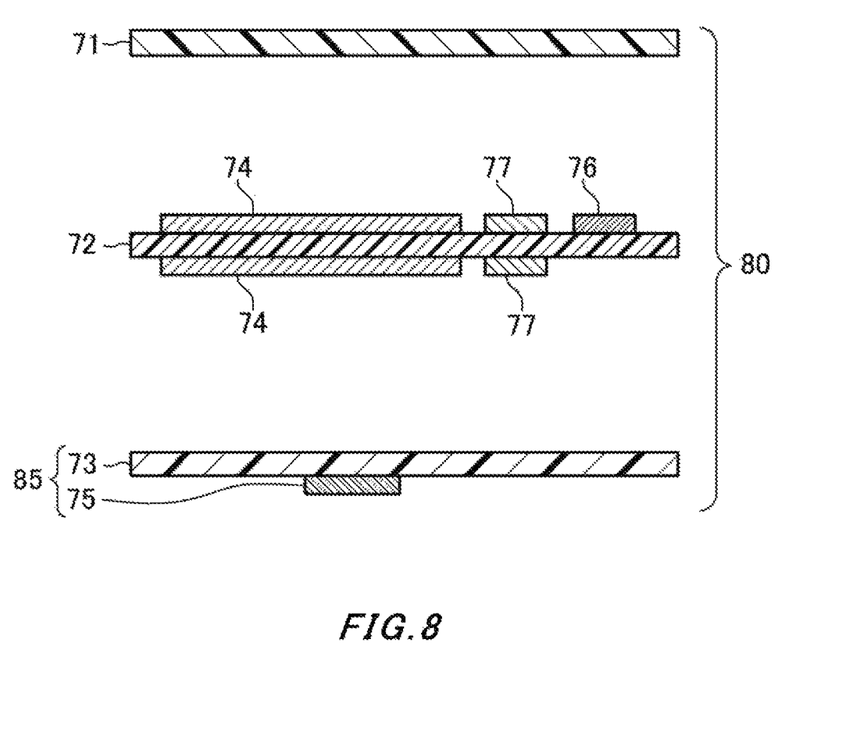
FIG. 8 is an exploded view of a layer structure of a touch panel using an antenna-equipped film according to a fourth embodiment of the present invention.

As illustrated in FIG. 8, the touch panel 80 according to the fourth embodiment has another film base 72 besides the antenna-equipped film 85, and a pair of electrode patterns 74 for detecting the touch position in the X direction and the touch position in the Y direction is divided onto the both surfaces of the other film base 72. The other film base 72 is laid on the surface of the film base 73 opposite to the surface with the antenna pattern 75, and a cover panel 71 is further laid on the film base 72. In addition, the other film base 72 is provided with a direction detection sensor pattern 77 and a Bluetooth antenna pattern 76 for detecting input in the air. The other film base 72 and the film base 73 are rectangular thin polyethylene terephthalate (PET) film bases, for example. The cover panel 71 is a rectangular thin member made of glass, polycarbonate (PC), or acrylic resin (PMMA), for example.

In the touch panel 80 according to the fourth embodiment, the pair of electrode patterns 74 and 74 can be separated onto the both surfaces, and therefore the electrode patterns can be simplified as compared to the case where the electrode pattern is provided on one surface.

As described above, the embodiment of the present invention provides the advantage of enabling reliable near field communications with the communication partner while matching the resonance point with the communication partner to the desired value. The embodiment of the present invention is useful for general antenna-equipped films and touch panels using the same.

What is claimed is:

1. An antenna-equipped film comprising:
a film base;
an antenna pattern formed on one surface of the film base; and
a number-of-winding setting circuit that is provided outside the film base and connected to the antenna pattern, wherein
the antenna pattern has both end portions positioned at the end edge of the film base and is formed as a plurality of linear loops surrounding a vacant area in the center,
the number-of-winding setting circuit is connected to corresponding end portions of the antenna pattern to constitute one spiral circuit, and
the number-of-winding setting circuit includes:
first wiring as a plurality of first linear patterns;
a plurality of first on-off elements that intervenes by two each in a position corresponding to each lap in the first wiring of the spiral circuit;
second wiring as a plurality of second linear patterns that is connected to the end portion of the innermost lap in the first wiring of the spiral circuit and a position between the two first on-off elements in each lap excluding the innermost lap and the outermost lap in the first wiring of the spiral circuit;
third wiring as a third linear pattern that is connected in common to the other ends of the plurality of second linear patterns; and
a plurality of second on-off elements that intervenes in the plurality of second linear patterns, and
the outer end of the spiral circuit and the third wiring constitute a pair of terminals.

2. The antenna-equipped film according to claim 1, wherein the number-of-winding setting circuit uses jumper switches as the first on-off elements and the second on-off elements.

3. The antenna-equipped film according to claim 1, wherein the number-of-winding setting circuit uses semiconductor switches as the first on-off elements and the second on-off elements.

4. The antenna-equipped film according to claim 1, wherein the film base includes a plurality of the antenna patterns.

5. The antenna-equipped film according to claim 1, wherein the antenna pattern has a linear width of about several to 20 μm or has wiring patterned in a meshed form to make the antenna pattern less visible.

6. A touch panel, wherein
an electrode pattern for detection of touch positions in an X direction and a Y direction is provided on the other surface of the film base of the antenna-equipped film according to claim 1, and
a cover panel is laid on the other surface.

7. A touch panel, wherein
the antenna-equipped film according to claim 1 further has another film base,
a pair of electrode patterns for detection of touch positions in the X direction and the Y direction is separately provided on the both surfaces of the other film base,
the other film base is laid on the surface of the film base opposite to the surface on which the antenna pattern is formed, and
the cover panel is laid on the other film base.

* * * * *